Nov. 19, 1968          B. L. PERRY          3,412,377
INTEGRATED FRESNEL-RAINBOW OPTICAL LANDING SYSTEM
Filed Feb. 9, 1966                      3 Sheets-Sheet 1

INVENTOR
BARBOUR LEE PERRY

BY
ATTORNEY

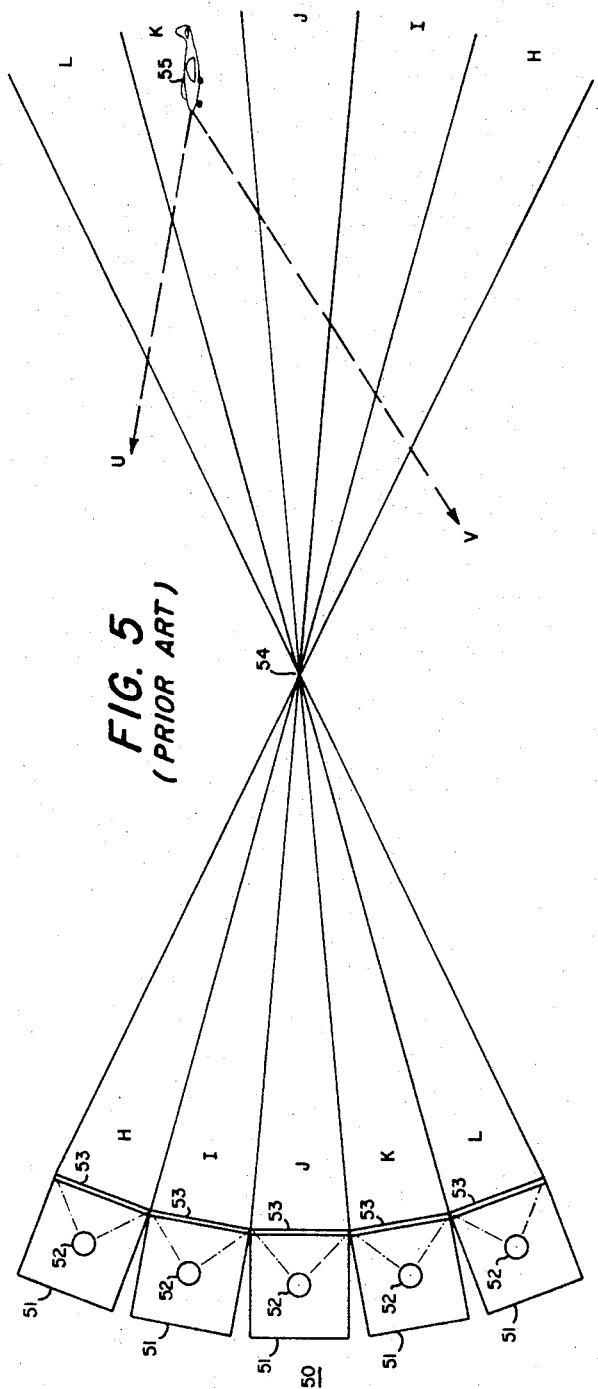

Nov. 19, 1968   B. L. PERRY   3,412,377
INTEGRATED FRESNEL-RAINBOW OPTICAL LANDING SYSTEM
Filed Feb. 9, 1966   3 Sheets-Sheet 3

FIG. 6a
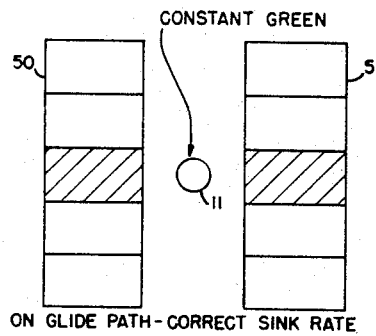
CONSTANT GREEN
ON GLIDE PATH - CORRECT SINK RATE

FIG. 6b
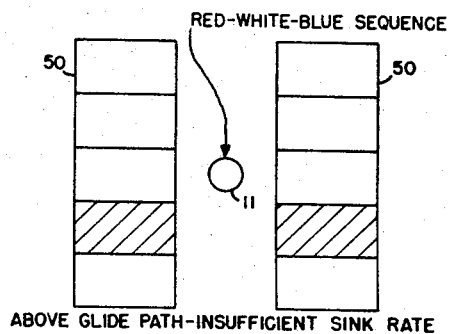
RED-WHITE-BLUE SEQUENCE
ABOVE GLIDE PATH - INSUFFICIENT SINK RATE

FIG. 6c
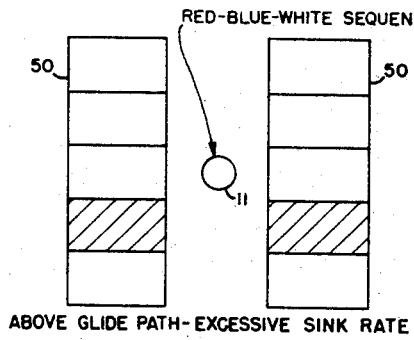
RED-BLUE-WHITE SEQUENCE
ABOVE GLIDE PATH - EXCESSIVE SINK RATE

FIG. 6d
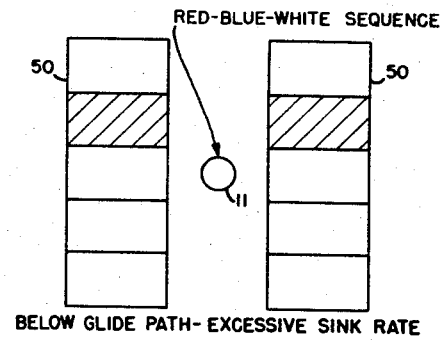
RED-BLUE-WHITE SEQUENCE
BELOW GLIDE PATH - EXCESSIVE SINK RATE

FIG. 6e
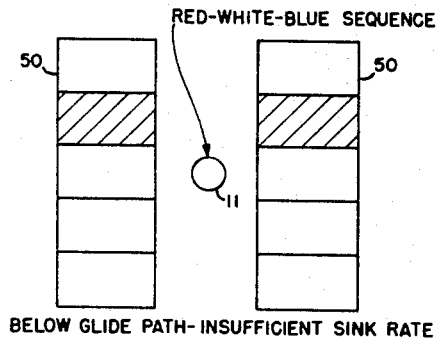
RED-WHITE-BLUE SEQUENCE
BELOW GLIDE PATH - INSUFFICIENT SINK RATE

INVENTOR
*BARBOUR LEE PERRY*

BY
ATTORNEY

United States Patent Office 3,412,377
Patented Nov. 19, 1968

3,412,377
INTEGRATED FRESNEL-RAINBOW OPTICAL LANDING SYSTEM
Barbour Lee Perry, Alexandria, Va., assignor to the United States of America as represented by the Secretary of the Navy
Filed Feb. 9, 1966, Ser. No. 526,670
9 Claims. (Cl. 340—26)

The present invention relates generally to improvements in optical guidance landing systems and the like and more particularly to a new and improved system wherein both altitude error and altitude rate-of-change error signals are presented on a single, integrated, visual display, which is located either on the ground or on the deck of an aircraft carrier.

In the field of optical guidance landing systems it has been the general practice to employ systems which provide altitude error information, such as the Fresnel Lens Optical Landing System (FLOLS), and recently a system has been invented which will provide altitude change rate error information. This is the Rainbow Optical Landing System (ROLS), which system is disclosed in detail in patent application, Ser. No. 427,521 filed Jan. 22, 1965, now Patent No. 3,353,153, in which H. P. Birmingham, A. W. Baldwin and B. L. Perry are co-inventors. Although such devices will serve the purpose, they are not entirely satisfactory under all conditions of service because neither the FLOLS nor the ROLS, individually provide both altitude error and altitude change rate error information.

The general purpose of this invention is to provide a visual presentation, on a single display, of both altitude error and altitude rate-of-change error information, thus embracing all the advantages of similarly employed optical guidance landing devices and possessing none of the aforedescribed disadvantages. To attain this the present invention contemplates a unique display arrangement whereby the FLOLS and ROLS are combined to simultaneously provide an indication of altitude error with respect to a desired glide path and the appropriateness of aircraft sink rate with respect to acquiring the desired glide path. The invention combines both of these types of information upon a single, integrated display and effectively provides the pilot of an approaching aircraft with quickened altitude information pertinent to the accurate control of his aircraft during the landing approach. In the past, quickened systems have required sensing of the component parameters and electronic or mechanical combination of the signals within the display, but in the device of this invention the combination of signals is accomplished through the geometrical configuration of the components of the system.

An object of the present invention is the provision of an optical indication of the appropriateness of a vehicle's position and motion.

Another object is to provide an optical guidance device having adequate sensitivity for precision vehicle guidance.

A further object of the present invention is the provision of visual indication of position error and change-of-position error to a landing aircraft.

Still another object of the invention is to provide a pilot during landing with information regarding the appropriateness of his position and of his rate of descent.

Yet another object is the provision of an optical guidance landing system which visually displays information to the pilot of a landing aircraft regarding his position and the rate of change of his position with respect to a desired glide path.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 5 is a vertical section of a lens portion of the invention;

FIGS. 6a–6e show frontal elevations of the ROLS and FLOLS combination of the present invention as seen by an approaching pilot in a landing aircraft for various aircraft positions and sink rates.

Figure 1:
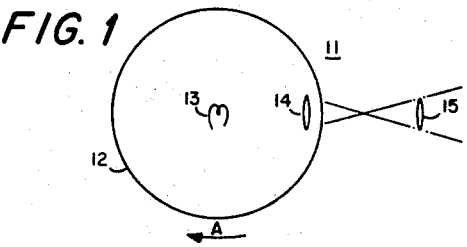
FIG. 1 shows an embodiment representative of the projecter of the Rainbow Optical Landing System.

Referring now to FIG. 1, there is shown a projector 11 comprised of a light source 13 and a lens system represented by a condensing lens 14 and a projection lens 15. Although not shown, it is intended that the projector include a suitable housing and means to concentrate the light from source 13 into the lens system. The lens system is adjusted to focus the projection object at optical infinity. The preferred embodiment of the projection object, shown by way of illustration only, is a transparent drum 12, upon the wall of which a color-coded pattern is affixed. The drum rotates about the high intensity light source 13 and condensing lens 14, so that the pattern moves in the focal plane of the projecting lens 15. The drum rotates in a direction indicated by the arrow A, and is driven by a drive source not shown.

Before proceeding with a description of the actual pattern of colors on the drum wall acting as a filter to code the projected light beam as a sequence of colors, the theory of operation of the ROLS system of FIG. 1 might better be reviewed to aid in the understanding of the pattern selected.

THE CONCEPT OF THE BACKWARD PROJECTOR

Figure 3:
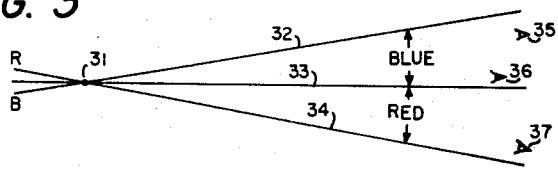
FIG. 3 is a line drawing to aid in the understanding of the present invention.
Figure 4:
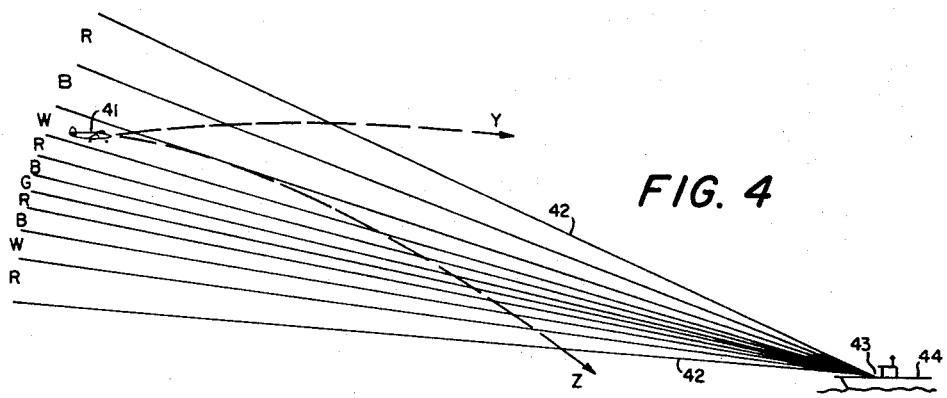
FIG. 4 illustrates the color-coded information inherent in the present invention.

Shown in FIGS. 3 and 4 are illustrations of light beams to aid in the understanding of the present invention. Shown in FIG. 3 is a two-color beam of light generated by a light source not shown, which beam is filtered by a two-color slide indicated by R and B, where R is red and B is blue, and projected from the projector 31. The upper half of the light beam is blue, generally indicated by lines 32 and 33, while the lower portion of the beam is red and extends between lines 33 and 34. Also shown in the figure are three viewers indicated by eyes at positions 35, 36 and 37. If the light beam is focused at optical infinity, and the viewers are positioned at a sufficient distance for the beam to be in focus, it will be noted that the viewers at positions 35 and 36 will be in the blue portion of the beam and the viewer at 37 is in the red portion, due to the inversion occasioned by the projecting lens at 31. The three viewers are looking back into the projector and thus at positions 35 and 36 only blue light will be seen from the source, while the light seen by a viewer at 37 is red. The apparent color of the lens being a function of the eye's position, the need for sensing eye position, and thus vehicle position, by mechanical or electronic instruments is obviated. The concept of backward projection is thus very simply direct viewing of the light from the projector and not the usual viewing of an image projected onto a screen.

THE CONCEPT OF THE DYNAMIC RAINBOW

Again referring to FIG. 3, if line 33, dividing the blue from the red portion of the beam, were to be considered the glide path, a pilot flying into the projector at position 35 would see only blue light, and if at position 37 would see only red light. If the pilot, formerly at position 35, is now at position 36, he will still see blue light because he remains above the glide path. With blue light indicating to the pilot that he is too high and red indicating that he is too low, his correction of position from 35 to 36 has failed to produce a change in indication even though he is indeed closer to the correct angle of approach. Such a system thus lacks the ability of indicating the size of the error and it provides no error rate information. The pilot at position 36 has no indication that the blue is about to become red, i.e. that he is about to go from a positive altitude error through the proper glide path into a position of negative altitude error. The pilot thus would most probably oscillate in his flight path, until by trial and error he might zero in on the glide path. Since the two-color slide filtering the projected light is stationary there is no means for presenting altitude rate information.

Figure 2:
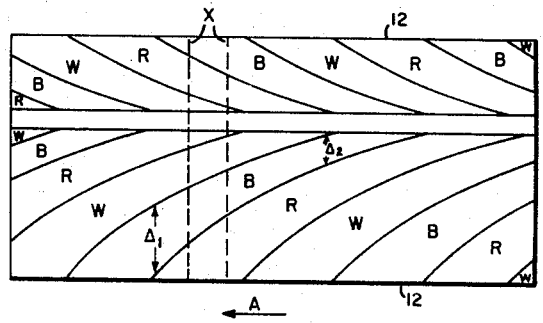
FIG. 2 shows a portion of the wall of the drum shown in FIG. 1 before its image is inverted by the projector lenses.

FIG. 4 shows an aircraft 41 flying in a hypothetical light beam 42, which for the purpose of illustration is enlarged to contain additional pencils of light in excess of the beam which would be projected by the pattern shown in FIG. 2. Beam 42 is projected from a carrier 44 by a projector 43. The light beam is divided angularly into a plurality of colored pencils, indicated from top to bottom by the letters R, B, W, R, B, G, R, B, W, and R, where R is red, B is blue W is white, and G is green. The pilot, being in a white pencil of this static rainbow, sees the source 43 as white. The two-color slide of the FIG. 3 illustration has thus been replaced by a slide in the projector having three colors, red, blue, and white in a repetitive pattern and a single occurrence of the color green. The green colored pencil is the desired glide path and is projected at the slope necessary for touchdown at the proper angle. The three colors, red, blue, and white are repetitive in that order in the vertical display, both above and below the glide paths.

If the pilot in the projected beam 42 should fly in a path generally indicated by the dashed line Y, he would see the light source appear to change from white to blue to red as he passes through the pencils of these colors. With previous knowledge that the projected beam was divided in the repeated sequence of red, blue, white, red, blue, white, from top to bottom, he would know as he saw the light change that his rate of descent was too small. As the pilot flies along the path designated by the dashed line Z, he will see the source of light change from white to red to blue, and know his rate of change of altitude, as indicated by the color sequencing, is too great. In addition, if the pilot observes a single constant color, he knows he should maintain his rate of change of altitude as he flies into the light source. The same information is obtained from any position in the pattern of light pencils and at any range, limited only by the pilot's ability to see the single light on the landing area. The hypothetical static rainbow guidance landing system of FIG. 4 provides guidance to the proper point of touchdown along any colored pencil in the display. Following the single colored pencils above the glide slope, however, might well result in a hard landing and possible damage to the aircraft. On the other hand, following a pencil below the proper glide path may result in a failure to make ramp clearance.

If instead of the static display shown in FIG. 4 the pencils of repeated color were caused to converge from above and below the desired guide path to that green pencil of light, the pilot flying in any one color would be guided into the proper angle of approach to touchdown. This then is the primary difference between the hypothetical static array shown in FIG. 4 and the dynamic display just described. The tri-colored slide in the projector 43 is continuously moving such that the red, white, and blue pencils are repeatedly cycled in toward the green pencil. The continuously converging pattern of colors will thus lead the pilot into the desired glide slope regardless of the particular color which he is following.

Since it is desirable to optimize the aircraft's approach to glide path, each dynamic light pencil is made to converge upon the green, on-glide-path pencil at a rate which is proportional to its instantaneous angle from the glide path, i.e. at an exponential rate. In addition, since it is desired that the ideal angle of approach be closely approximated, the green pencil indicating that angle is quite narrow, i.e. the green is a ±0.1 degree angular envelope about the proper slope and has a beamwidth of thirty-five feet at a range of ten thousand feet and approximately one and three-quarters feet at a range of five hundred feet, and those pencils converging on the glide slope have a width decreasing in proportion to their closeness to that path. This desired change in pencil width is also concomitant with exponential color convergence.

The transparent coded filter in the developed view of a portion of the wall of the rotating drum shown in FIG. 2 can now be readily explained. A thin horizontal stripe is shown on the drum 12 parallel to the line of drive A of the drum and approximately one-third of the distance from the top of this drum wall view. This stripe or band labeled G for green represents the proper glide slope. The remainder of the pattern shown in this figure is a series of bands labeled either W, or R, or B, designating white, red and blue, converging exponentially from the outer edges of the transparency into the glide slope band. As the drum 12 is driven in the direction A, a column of light as indicated by dashed lines at X-position, for example, would be divided from top to bottom into the colors blue, red, white, green, red, white, blue and red, each moving color converging down from the top and up the column from the bottom into the green with the continued movement of the drum. It will be noted that because of the steeper angle of the bands at the outer edge of this filter, the vertical movement will be more rapid and gradually slowing with the lessening angle at an exponential rate as the bands approach the green. Also to be noted is the change in vertical dimension of any of the red, white, or blue bands across the filter, as indicated by the dimensions $\Delta_1$ and $\Delta_2$, in the blue band shown in FIG. 2. These latter described characteristics of the exponentially arrayed stripes account for the aforedescribed movement of each light pencil within the projected beam at a rate directly proportional to their distance from the glide path while each pencil undergoes a change in vertical width in proportion to its distance from that path. It should be noted that FIG. 2 is simplified for purposes of illustration. In practice there may be several sets of color bands above and below the glide path.

In brief, then, a pilot following the guidance or command of the propected dynamic rainbow beam of the ROLS interprets the changing color sequence as an indication of sink-rate error, a steady green light as an indication that he is within the fixed limits of glide path, and any steady color other than green as an indication that he is off glide path but is approaching it from above or below at the proper rate. The rate of the color sequencing indicates the size of his descent rate error. That is, if the colors sequence very slowly he knows that his rate of descent is very close to that commanded by the system, while rapid color change informs the pilot that his rate of descent is quite different from that commanded by the system. In response to color change, therefore, a pilot must maneuver his craft by correcting his rate of descent until the change becomes slower and finally a constant color is observed from the projector. When a single color is observed the pilot has performed his task by maneuvering his craft into this appropriate path, and he can continue toward the landing area, merely maintaining his present rate of descent knowing that even if he strays from a single color light pencil, each dynamic pencil will bring him into the ideal slope for landing.

In the developed view of the wall of drum 12 shown in FIG. 2, the green stripe representing the glide slope is positioned one-third of the distance from the top of the drum. The placement of this band is such as to obtain the desired result of having the glide slope two degrees above the bottom of the projected beam with four degrees of the pattern above that proper landing path. The placement of this band near the top of the drum and its location in the bottom third of the beam is due to the inversion caused by the lens system of the projector.

THE CONCEPT OF THE FRESNEL LENS OPTICAL LANDING SYSTEM

Referring now to FIG. 5 there is shown a lens assembly 50 comprised of five separate light cells 51, each cell containing three lamps 52, one of which is shown (supports not shown), which are arranged in line and horizontally. The cells are stacked vertically to provide a light source which is three lamps wide and five lamps high, but it is obvious that a different number of cells and lamps could be used. An individual lens system 53 is provided for each cell 51, and each lens system is separated from its corresponding light source 52 by a vertical baffle (not shown). A rectangular slot in another baffle (not shown) is covered by a translucent piece of glass, and the lamp 52 illuminates the piece of glass so that the piece of glass, defined by the slot, becomes the object.

The lens systems 53 each comprise an optical glass, a Fresnel lens, and a lenticular lens which are arranged with a corresponding lamp 52 so as to provide a real focal point 54 in front of the lens system. The cells 51 are arranged at an angle of 18 to 20 minutes with respect to each adjacent cell so that the real images of the objects of each cell coincide at point 54, approximately 150 feet in front of the lens systems.

The arrangement of the lens systems 53 with respect to their corresponding lamps 52 and the physical properties of the lens systems cause the light from lamps 52 to converge at focal point 54 and then to diverge, thus causing the image, as seen by a pilot in an approaching aircraft 55, to move up or down with a corresponding movement down or up, respectively, by the aircraft.

As shown in FIG. 5, an aircraft 55 is flying in light beam K and the pilot sees the light beam K, only. If the pilot in the beam K should fly upward in a path generally indicated by the dashed line U, he would see the light source appear to move downward and he would then see the light beam L. As the pilot moves downward along the path designated by the dashed line V, he will see the light source appear to move upward as he passes through light beams J, I and H, in that order.

Thus, it can be seen that by the use of a reference marker of some sort, which is situated in the plane of desired movement for the aircraft and which is oriented with respect to the Fresnel lens system of FIG. 5 the altitude error of the approaching aircraft with respect to the desired plane of movement, or the glide-path plane, is optically conveyed to the pilot.

THE CONCEPT OF THE INTEGRATED FRESNEL RAINBOW OPTICAL LANDING SYSTEM

With reference now to FIGS. 6a–6e, there is shown the combination of the FLOLS and the ROLS to form the Integrated Fresnel Rainbow Optical Landing System (IFROLS) of this invention. In each of the FIGS. 6a–6e the source light or "meatball" 11 is the unmodified ROLS of FIG. 1 and the reference or datum lights consist of two identical Fresnel units 50, such as shown in FIG. 5, where the object distance is such that the image appears to move in the opposite direction from the movement of the viewer's or pilot's eye. The ROLS 11 must be precisely positioned with respect to the Fresnel units 50 so that the green stripe on the ROLS drum (shown in FIG. 2) is in exact alignment with the center of the Fresnel units 50, and so that the pilot observing a steady green "on-glide-path" light from the ROLS 11 will also see the datum lights 50 in alignment with the ROLS or "meatball."

When the pilot is on the desired glide path and when his sink rate is proper to maintain his position in the glide path he will continuously see the configuration of FIG. 6a. The datum lights of Fresnel units 50 will be aligned with the "meatball" 11 to show the pilot that his altitude is correct and the "meatball" or ROLS 11 will show a constant green color to indicate that the aircraft is on the glide path.

The pilot who is above the desired glide path with an insufficient sink rate will see the indication represented by FIG. 6b where the datum lights of Fresnel units 50 are seen below the "meatball" to show the pilot that he is above the desired glide path, and the "meatball" or ROLS will show a color sequence of red-white-blue to indicate that the aircraft's sink rate is insufficient.

FIG. 6c shows what would be seen by an approaching pilot who would be above the desired glide path with an excessive sink rate to bring him gradually and accurately into the glide path. The datum lights of Fresnel units 50 are seen below the "meatball" to indicate to the pilot that he is above the desired glide path, and the "meatball" or ROLS will show a red-blue-white color sequence to show that the sink rate of the aircraft is excessive.

If the pilot is below the desired glide path with an excessive sink rate he will see the indication of FIG. 6d. The datum lights are seen above the "meatball" to show the pilot that he is below the desired glide path, and the "meatball" or ROLS will show a color sequence of red-blue-white to warn the pilot that the aircraft's sink rate is too great.

FIG. 6e represents that which would be seen by an approaching pilot who would be below the desired glide path but with an insufficient sink rate to bring him gradually and accurately into the glide path. The datum lights of Fresnel units 50 are seen above the "meatball" to show that the aircraft is below the desired glide path and the "meatball" or ROLS will show a color sequence of red-white-blue to indicate that the aircraft's sink rate is insufficient.

The ROLS unit has a vertical field of 4 degrees above glide path and 2 degrees below. The standard Fresnel unit has a vertical field of ±0.75 degree. If these fields are maintained, the pilot will observe both the "meatball" and the datum lights, and thus receive both altitude rate error and altitude error indications within ±0.75 degree of glide path, but he will still receive corrective rate information from the ROLS when his error from glide path is larger than ±0.75 degree, i.e. up to 4 degrees above glide path and up to 2 degrees below glide path.

Many variations in this system are contemplated, but the random combination of the two component systems would not constitute the present invention. The FLOLS could be placed, unaltered, near a ROLS, but not precisely positioned so that the center of the ROLS drum is angularly aligned with the center of the FLOLS. Thus, both altitude and altitude rate information could be displayed but not on one integrated unit, and not without the need of additional datum lights. The pilot would be required to shift his attention from one display to the other rather than to concentrate on merely one integrated display, as represented by this invention.

One of the variations contemplated would include only one Fresnel unit 50, rather than two, but two would be more consistent with the present FLOLS which has two datum arms, one on either side of the "meatball." The Fresnel units 50 as used in this invention could be color-coded with filters to indicate the outer limits of the Fresnel field. The top cells 51 of the Fresnel units 50 could include red filters to indicate dangerously low altitudes (taking into consideration the inversion of the light beams from the Fresnel units beyond the focal point 54), and the bottom cells could include amber filters to indicate dangerously high altitudes.

Still another contemplated variation comprises one Fresnel unit and two Rainbow systems precisely located one on either side of the Fresnel unit. The error signals would be interpreted just as described in connection with FIGS. 6a–6e, but such a system would have the advantage that the center light or "meatball," rather than the datum lights, would be dynamic and, in this embodiment, would move in the same direction as the viewer's eye. This movement of the image of the FLOLS in the same direction as the movement of the observer would be achieved by arranging the cells and lens systems of the FLOLS so as to cause the objects to appear as a common virtual image behind the cells, rather than as the real image 54, as shown in FIG. 5.

It can be seen that the present invention effectively provides on a single, integrated display, a signal for both altitude error and sink-rate errors. A pilot approaching the display can discriminate either piece of information singly as his primary guide or he can rely on both pieces of information in combination in order to aid in a safe approach and landing, either on the ground or on the deck of an aircraft carrier.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. An optical guidance landing system for simultaneously projecting, from a landing area to a pilot, a visual indication of both aircraft position and position change rate with respect to a desired glide path, comprising: projection means located in said landing area and including a light source, and a lens arrangement operatively associated with said light source to focus a beam of light from said light source at optical infinity;

said beam of light being directed at an angle to said landing area representative of the angle of said desired glide path with respect to said landing area;

at least one transparent, color-coded drum having a repetitive color pattern and predeterminedly oriented in said beam of light so as to indicate position change rate and said desired glide path;

at least one drive means to continuously move said drum through said beam of light in a predetermined direction such that said beam of light is caused to be altered in accordance with said pattern;

and reference light means operatively associated with said drum to enable a pilot to ascertain his position error relative to said desired glide path.

2. The system of claim 1, wherein said lens arrangement comprises a condensing lens and a projection lens, and the wall of said transparent drum is driven by said drive means between said condensing lens and said projection lens.

3. The system of claim 1, wherein said reference light means include:

a plurality of adjacent cells;

each of said cells comprising a plurality of aligned lamps and a lens system oriented with respect to said lamps to form an image from said lamps at a focal point.

4. The system of claim 3, wherein said cells are so arranged with respect to one another that the image of light from each of said cells coincides with the image of light from every other adjacent cell.

5. The optical guidance landing system of claim 4:

wherein said pattern comprises a plurality of bands of at least three different colors exponentially converging into a single band of a color distinct from said three different colors;

said single band traversing said color-coded drum parallel to the line of said predetermined direction of drive and in alignment with said plurality of lamps of the center cell of said cells; and said bands being arranged in a repetitive sequence;

whereby said beam of light filtered by said color-coded drum will appear to be angularly displaced with respect to the light of said reference light means, as seen by an approaching pilot, so as to indicate position error, and whereby said beam of light will be angularly divided into light pencils of at least three different colors which will repeatedly converge onto a single pencil of distinct color and a pilot flying into said beam will see a source of light from said landing area changing color, so long as his rate of descent differs from the rate of color convergence of said beam, and of constant color becoming said distinct color representing said desired glide path, when his rate of descent matches the rate of color convergence.

6. The system of claim 1, wherein said reference light means include:

a plurality of adjacent cells;

each of said cells comprising a plurality of aligned lamps and a lens system oriented with respect to said lamps to form a real image.

7. The system of claim 6, wherein said cells are so arranged with respect to one another that said real images of light from each of said cells coincide with said real images of light from every other adjacent cell.

8. The method of guiding an aircraft to a safe landing in a landing area either on the ground or on the deck of an aircraft carrier comprising:

projecting light from reference light means located in said landing area;

projecting a beam from said landing area of different colored light pencils which continuously converge vertically in a repeated order and at a preselected rate into a fixed pencil of distinct color, said fixed pencil being projected at an angle corresponding to a desired glide path, and said fixed pencil being operatively associated with said reference light means;

and maneuvering said aircraft to remain within any one pencil of color until said beam is aligned with light from said reference light means and said aircraft is within said fixed pencil of distinct color.

9. The method of claim 8, wherein the step of maneuvering includes adjusting the altitude of said aircraft to align said beam with light from said reference light means by adjusting the rate of sink of said aircraft to match the rate of convergence of said different colored light pencils.

No references cited.

JOHN W. CALDWELL, *Primary Examiner.*

ALVIN WARING, *Assistant Examiner.*